March 31, 1964 K. LÜTKE 3,126,745
DENSIMETERS
Filed Nov. 12, 1959 2 Sheets-Sheet 1
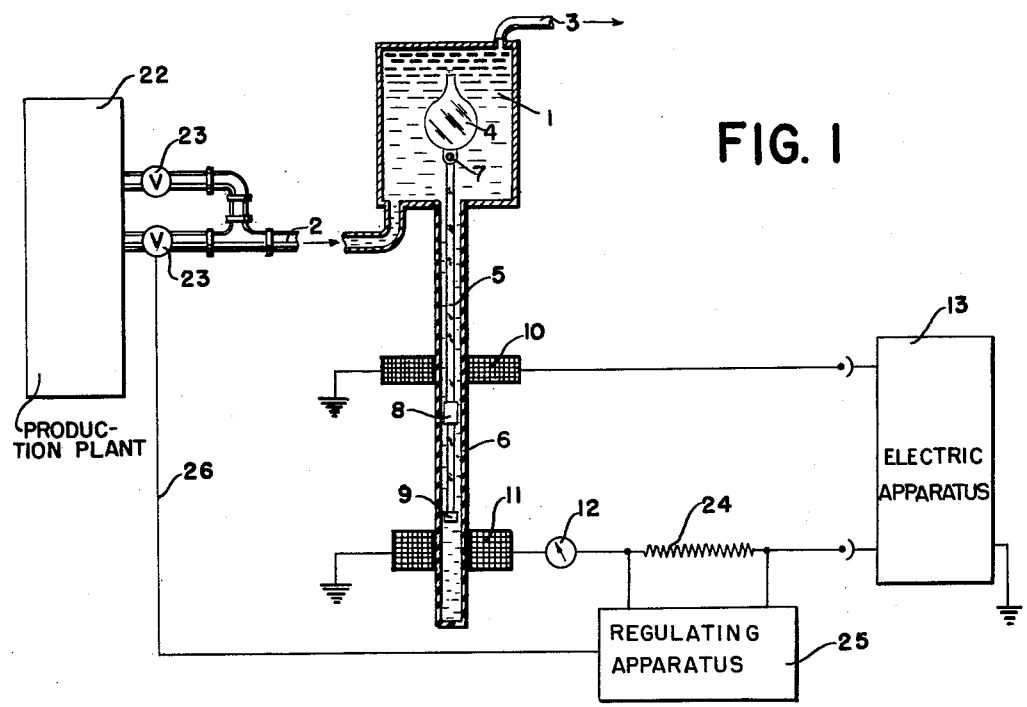
FIG. I
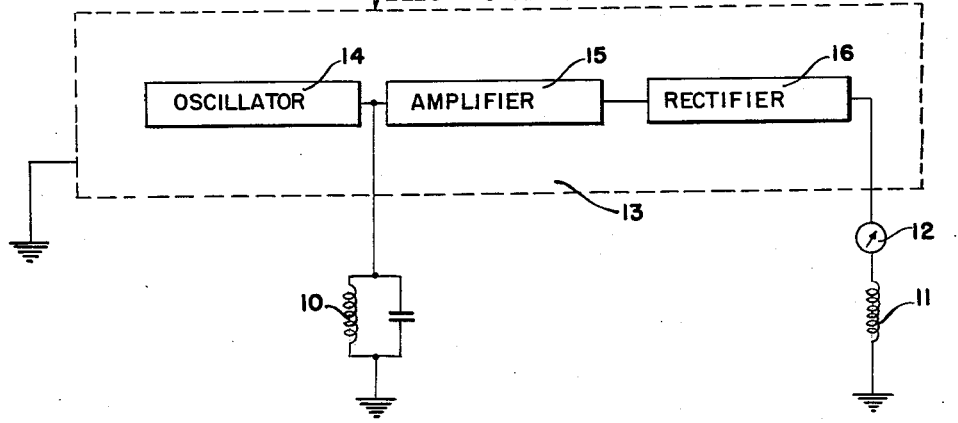
FIG. 2
INVENTOR.
KLAUS LÜTKE March 31, 1964 K. LÜTKE 3,126,745
DENSIMETERS
Filed Nov. 12, 1959 2 Sheets-Sheet 2

INVENTOR.
KLAUS LÜTKE

United States Patent Office 3,126,745
Patented Mar. 31, 1964

3,126,745
DENSIMETERS
Klaus Lütke, Leuna, Germany, assignor to VEB Leuna-Werke "Walter Ulbricht," Leuna, Germany
Filed Nov. 12, 1959, Ser. No. 852,283
11 Claims. (Cl. 73—453)

This invention relates to densimeters and in particular to devices which continuously measure the density of a fluid as it flows through the measuring device and produce criteria for automatic regulation of the equipment producing the fluid.

Many methods and apparatus for the measurement of fluid density are known to those skilled in the art. Examples of methods which are frequently used may conveniently be described as the weighing method, the buoyancy method, the hydrometer method, all of which are most suitable for laboratory use. These methods are hardly convenient for constant and continuous use in the chemical process industry where it may be necessary to continuously measure density of a fluid as it passes a given point in the process and to control the process in response to the measured density.

Apparatus for continuous measurement of fluid density are available which depend upon the buoyancy principle and where the path of a float is inductively measured and transmitted. This known process is deficient in that springs or the like must be arranged within the medium to be measured, whereby the durability and stability of the former may be adversely affected if the fluid traversing the measuring chamber is corrosive. In addition, the path required for inductive measurement disproportionately increases the size of the measuring chamber in the apparatus.

It is an object of this invention to provide an improved densimeter.

It is a further object of this invention to provide a densimeter capable of continuously measuring the density of fluids flowing past a point.

It is another object of this invention to provide apparatus for a source of fluid flow which will continuously measures the density of the fluid as it flows past a point and is able to automatically regulate the source in response to the density of the fluid.

Still another object of the invention is to provide a densimeter which requires a minimum of space.

A further object of the invention is to provide a densimeter wherein the travel of the float is restricted in the vertical direction by means which respond to the density of the fluid measured.

A still further object of the invention is to provide a device for measuring the density of a continuous flow of fluid wherein electrical means are responsive to the position of a float within the device and in turn tend to force the float in the direction opposite to that which it tends to move as a result of variations of density of the fluid measured.

It is also an object of this invention to avoid the disadvantages noted above in known densimeters.

Other objects and advantages of the invention will become obvious from the remainder of the specification.

In accordance with the invention there is provided a container having ports for intake and discharge of fluid to be measured, whereby a constant flow of fluid may be maintained through the container, a float positioned in the container, electro-mechanical means for sensing and measuring the vertical position of the float and having an output signal, means responsive to the output signal of said sensing means to bias the float to a median position in the container with a force responsive to the magnitude of the output signal, and meter means for measuring the output signal.

For a more complete understanding of the nature and scope of the invention, reference may be had to the following detailed description which may be read in connection with the accompanying drawing in which:

FIG. 1 is an exemplary embodiment in which there is illustrated the invention;

FIG. 2 is a schematic diagram of a circuit as used in the invention as embodied in FIG. 1.

Figure 3:
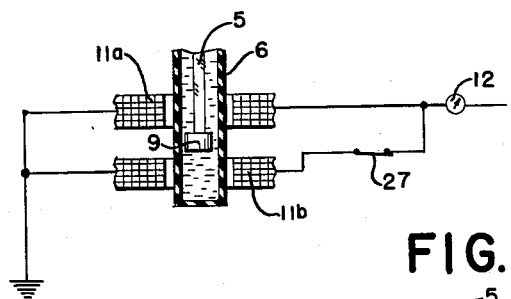
FIGS. 3 through 6 illustrate in part further embodiments of the invention showing only those portions of the apparatus which differ from FIG. 1.

Referring now to FIG. 1 there is shown a container or chamber 1 through which the fluid originating from a production plant 22 and subsequently to be measured flows. Chamber 1 has an intake 2 connected through valves or duct openings 23 to the plant 22 and a discharge 3 projecting from the chamber. A hollow, teardrop-shaped float 4 is provided within the container with a depending rod 5, preferably made of glass, and articulated from the float 4 at a pivot 7. A tubular column 6, which is advantageously made of electrically insulating material, extends downwardly as an extension from the container 1 and receives the rod 5. A ferrous core 8 which is preferably only temporarily magnetizable and a permanent magnet 9, preferably a ceramic ring magnet, are molded onto the rod 5 at spaced positions within the column. The poles of magnet 9 are oriented substantially in axial direction of the surrounding tubular column 6. A variable inductance transmitter or oscillator coil 10 and a solenoid 11 for producing a magnetic field are positioned at spaced locations surrounding and coaxial with the column 6, the coil 10 being located above the solenoid 11 as shown in FIG. 1. An ammeter 12 is connected between the electric apparatus generally designated 13 and the solenoid 11. Apparatus 13 is also connected to the oscillator coil 10. It will be understood that the ammeter 12 is representative of any current measuring instrument which may be suitably used. The ammeter 12 can also be combined with any current sensitive control device which may be used to vary the density of the fluid measured, as shown in FIG. 1 but described somewhat later.

Apparatus 13 is more particularly shown in FIG. 2 and comprises an oscillator 14 which is coupled to a tank circuit of which the transmitter or oscillator coil 10 is part. Any high frequency voltage occurring in the tank circuit, which is dependent on the relative position between the coil 10 and the core 8, is transmitted to an amplifier 15 the output of which is fed into a rectifier 16. The current from the rectifier 16 passes to the solenoid 11 through ammeter 12, and optionally also through a resistance 24, as will be explained later.

In operation the fluid originating from the plant 22 and to be measured is passed from intake 2 to discharge 3 and completely fills the container 1. The specific weight of the float 4 is chosen so as to float freely within the densest fluid to be measured and to readily sink when the density of the fluid decreases. In determining the specific weight of the float, the weight of the rod 5 and elements 8 and 9 is also considered. When the float 4 tends to sink as a result of a decreased fluid density, the core 8 moves downward and away from coil 10, thus increasing the current supplied to solenoid 11 by means of the amplifier 15. In addition, the lower pole of permanent magnet 9 approaches the magnetic field of the solenoid 11 which is arranged to have its upper portion of like polarity with respect to the lower pole of magnet 9. Thus a repelling upward force is exerted upon the permanent magnet 9 and the float 4 connected thereto. The repellent force is of course dependent upon the number of turns of wire in the solenoid 11, the current through the windings and the distance between the like poles of the magnet 9 and of the solenoid 11. As can be seen, a sinking movement of the float 4 increases the current in solenoid 11 and decreases the distance between the like poles. Both of these results cause an upward reactive magnetic force which tends to move the float 4 toward its original position which it will approach even for very low density fluids. It will thus be obvious that the container 1 may be quite small and still be suitable for measuring extreme variations in density of the fluid measured since changes in the position of the float 4 are quite small. The current in the ammeter 12 is also quite small but since current measuring instruments which are very sensitive are readily available, small changes in position of the float 4 need not adversely affect the sensitivity of the entire apparatus.

The magnitude of the current in ammeter 12 is a measure of the density and can also be used for controlling the production plant which feeds the fluid to the measuring device. For example, as shown in FIG. 1, the current in ammeter 12 may be passed through a low resistance 24 and the voltage across the resistance is thus used to control, by the intermediary of a conventional regulating apparatus 25 and its associated control leads 26, the valves or duct openings 23 of the production plant 22 which feed the components to form the fluid to be measured.

The magnetic field of the solenoid 11 and the operative reactive force are dependent upon the current through the coil and the number of turns therein, so that the measuring range thereof may be selectively altered by alteration of the number of turns. Thus a switch may be provided (not shown) which selectively connects the meter 12 to one of a series of taps along the winding of solenoid 11, which therefore makes it possible to switch from a wide to a narrow range of measuring values.

A variation is depicted in FIG. 3 which for convenience is a schematic showing of the lower portion of FIG. 1; the remainder of the apparatus being as depicted in FIG. 1. Two solenoids 11a and 11b are substituted in FIG. 3 for the single solenoid 11 of FIG. 1. The windings of solenoids 11a and 11b may be either series or parallel connected to the electrical apparatus 13 shown in FIG. 2 so that the magnetic forces which they produce upon the permanent magnet 9 when positioned as shown are in the same reinforcing direction. One of the solenoids 11a and 11b may be advantageously switched into and out of the circuit. FIG. 3 shows the solenoids 11a and 11b in parallel connection, the latter being disconnectable by means of switch 27.

A greater reactive force can be exerted upon the float body 4 by substituting two vertically spaced magnets molded to the rod 5 for the permanent magnet 9; the spacing between the two substitute magnets being approximately the length of the solenoid 11. The two magnets are then so arranged that the forces upon each of them are exerted in the same direction by the energized solenoid 11.

Figure 4:
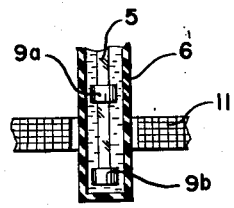

Such an embodiment is depicted in FIG. 4. Here again only the lower portion of the embodiment, which differs from FIG. 1, is presented; the remainder being substantially the same as in FIG. 1. The permanent magnet 9 of FIG. 1 has been replaced by a pair of suitable permanent magnets 9a and 9b molded to rod 5 at spaced positions separated approximately by the vertical length of the solenoid 11 which surrounds the tubular column 6.

The measuring range can be further regulated, while maintaining the basic structure of the apparatus, by means of a supplementary magnetic field which may be advantageously superimposed upon the magnetic field of the measuring current. With this arrangement the percentage of change in force of the total magnetic field is less than the measured difference in current and therefore the density measuring range is smaller and more sensitive because the possible current change which is controlled by the oscillator coil 10 remains constant. The supplementary magnetic field is conveniently created, for example, by a second current-carrying winding (not shown) on the winding of solenoid 11. Both windings are interlaced similar to bifilar windings.

It is also possible to vary the measuring range by varying the dimensions of the floating bodies such as the float 4. A decrease in the volume of the float 4 will cause an increase in the measuring range and an increase in volume of the float will result in a decreased range. This is caused by the fact that the increase in buoyant force, per unit increase in density of the fluid buoying a weight, is greater for large volumes than for small volumes.

Figure 5:
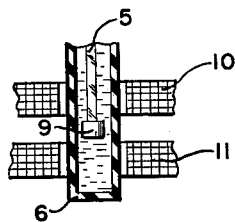

It is also possible, as shown in FIG. 5, to eliminate the core 8 altogether and to allow the permanent magnet 9 to usurp the function of the core by lessening the separation between oscillator coil 10 and solenoid 11 to such an extent that the permanent magnet immediately slips into the unidirectional field of the solenoid when it slides out of that of the oscillator coil.

The arrangement can also be embodied in such a manner that the magnet 9 is drawn into the solenoid 11 by the magnetic field of the latter. The float 4 must then be so constructed that it will draw the rod 5 upward. In this case, unmagnetized iron may be used for the magnet 9.

Figure 6:
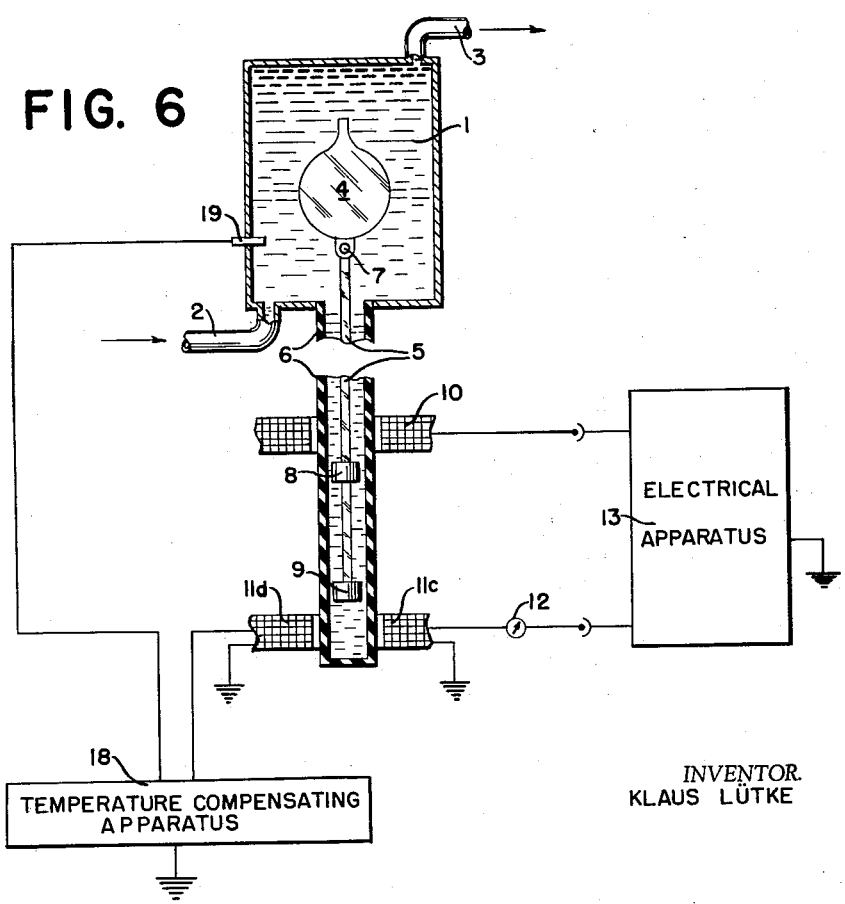

For the purpose of accomplishing density measurements independent of temperature it is necessary to provide temperature compensating means. The change in density that results from temperature variations and is measured as a change in force is in these cases a similarly large opposing force in the form of still another magnetic field which is controlled by the temperature. As a result, a change in density caused by temperature fluctuation does not cause a variation in the current in the ammeter 12 because the essential reactive force of another magnetic field is provided. This improvement is shown in FIG. 6. The magnetic field is advantageously produced by another winding 11a on a solenoid 11c, for example, by means of bifilar windings. Solenoid 11c replaces in this embodiment the solenoid 11 of FIG. 1. The winding 11d is fed by a temperature compensating apparatus 18. The latter is connected to a temperature sensing element 19 provided preferably at the container 1 for sensing the temperature variations of the fluid passing therethrough. The windings 11c and 11d are used simultaneously to alter the measuring range.

The new apparatus disclosed herein has the advantage, among others, that the float travels over a limited vertical distance thereby allowing use of a limited size container. In addition, no springs or other auxiliary means are necessary for the medium because the entire float can be coated with glass, for example. Furthermore, a computation is possible of the resulting forces of familiar density changes, so that calibration of the instrument can be accomplished by simple means and without difficulty.

Since changes may be made in the above described constructions, and different embodiments of the invention may be made without departing from the spirit and scope thereof, it is intended that the above be considered illustrative and not in a limiting sense. The features of novelty of the invention are particularly described in the following claims.

I claim:

1. An apparatus for continuous measurement and regulation of a compound fluid supplied from a production plant, comprising a container, a fluid intake port on the lower portion of said container, a fluid discharge port on the top of said container whereby fluid may completely fill said container, a float in said container adapted to be completely immersed in said fluid and to remain in a predetermined position for a given fluid density, said container having a tubular extension filled with said fluid, a rod connected to said float for vertical movement therewith and protruding into said extension, an inductance-varying core secured to said rod, a permanent magnet secured to said rod and spaced from said core, an electronic probe positioned outside of said container and surrounding said extension for producing a signal varying in accordance with the vertical position of said core, electrical means connected to said probe for generating a current in proportion with said signal received from said probe, a solenoid surrounding said extension and fed by said current, said solenoid being positioned near said magnet whereby said permanent magnet and said float are forced toward a median position within said extension and said container, respectively, in response to said current from said electrical means, whereby movement of said core causes a magnetic force acting upon the movement of said magnet, meter means connected between said solenoid and said electrical means for measuring said current from said electrical means which is a measure of the density of said fluid, and regulator means comprising resistor means in the circuit of said meter means and valve means between said production plant and said container, for regulating the flow of the components of said compound fluid from said plant in dependence of the variations of said current from said electrical means.

2. An apparatus as set forth in claim 1, wherein said probe includes a transmission coil, and said electrical means includes an oscillator connected to said transmission coil and an amplifier responsive to the output of said oscillator, said output being determined by inductive changes in said transmission coil by movement of said core within said coil.

3. An apparatus as set forth in claim 2, wherein said solenoid includes a pair of windings spaced apart along said extension, wound and connected for producing reinforcing reinforcing magnetic fields on each side of said permanent magnet whereby one winding forces said magnet in a direction away from that winding and the other winding attracts the permanent magnet in the same direction.

4. An apparatus as set forth in claim 2, wherein said permanent magnet includes two bi-polar portions spaced along said rod and on either side of said solenoid, said magnet portions having their poles oriented in opposite directions, whereby one of said portions is attracted into said solenoid by one pole of said solenoid and the other of said portions is repelled in the same direction by the opposite pole of said solenoid.

5. An apparatus as set forth in claim 2, wherein said solenoid includes a pair of windings for producing a reinforced magnetic field and switch means adapted to remove one of said windings from connection with said meter means and said electrical means.

6. An apparatus as set forth in claim 2, further comprising a second solenoid positioned around said extension and connected to produce a magnetic field in response to temperature changes in said fluid.

7. An apparatus for continuous measurement and regulation of a compound fluid supplied from a production plant, comprising a container, a fluid intake port on the lower portion of said container, a fluid discharge port on the top of said container whereby fluid may completely fill said container, a float in said container adapted to be completely immersed in said fluid and to remain in a predetermined position for a given fluid density, said container having a tubular extension filled with said fluid, a rod connected to said float for vertical movement therewith and protruding into said extension, a magnetizable core secured to said rod, an electronic probe positioned outside of said container and surrounding said extension for producing a signal varying in accordance with the vertical position of said core, electrical means connected to said probe for generating a current in proportion with said signal received from said probe, a solenoid surrounding said extension in spaced relationship from said electronic probe on the other side of said core, said solenoid being fed by said current from said electrical means whereby said core and said float are forced toward a median position within said extension and said container, respectively, in response to said current, meter means connected between said solenoid and said electrical means for measuring said current from said electrical means which is a measure of the density of said fluid, and regulator means comprising resistor means in the circuit of said meter means and valve means between said production plant and said container, for regulating the flow of the components of said compound fluid from said plant in dependence of the variations of said current from said electrical means.

8. An apparatus for continually measuring the density of a fluid, comprising a container for said fluid having an elongated, substantially vertical portion, a fluid intake port and a fluid discharge port on said container, float means within said container and at least partly within said elongated portion, a temporarily magnetizable core and a permanent magnet secured to said float means in spaced-apart relation within said elongated portion, electronic sensing means positioned at a first location outside of said elongated portion and responsive to the relative movement of said core for producing a signal proportional to said density, additional means positioned at a second location outside of said elongated portion and having a magnetic field adapted to be varied by said signal for repelling said magnet and moving said float means toward a median position within said container, said sensing means and said additional means being vertically displaced at said locations in a laterally spaced-apart relation from the substantially vertical axis of relative movement of said float means, oscillator means adapted to be influenced by the varying inductance of said sensing means, rectifier means connected to said oscillator means, and meter means connected in series with said additional means and said rectifier means and being responsive to said signal for producing a direct density indication.

9. An apparatus as set forth in claim 8, wherein said core is farther away from said container than said sensing means and said magnet is closer to said container than said additional means, the distance between said locations allowing said float means to reciprocate within a substantial density range of said fluid.

10. An apparatus as set forth in claim 8, wherein said magnet is located about midway between said sensing and said additional means, said core being combined with said magnet, and wherein the distance between said locations is predetermined so that said magnet is adapted to slip into said magnetic field as soon as it leaves the field of said sensing means.

11. An apparatus for continually measuring the density of a fluid, comprising a container for said fluid having an elongated, substantially vertical portion, a fluid intake port and a fluid discharge port on said container, said fluid intake and discharge ports being respectively located on the lower and upper portions of said container so that said fluid may completely fill said container and said elongated portion and continually pass therethrough, float means within said container and at least partly within said elongated portion, a temporarily magnetizable core and a permanent magnet secured to said float means in spaced-apart relation within said elongated portion, electronic sensing means positioned at a first location outside of said elongated portion and responsive to the relative movement of said core for producing a signal proportional to said density, first additional means positioned at a second location outside of said elongated portion and having a magnetic field adapted to be varied by said signal for repelling said magnet and moving said float means toward a median position within said container, said sensing means and said first additional means being vertically displaced at said locations, temperature compensating means adapted to sense the temperature of said fluid prevailing in said container, second additional means adjacent said first additional means and connected to said temperature compensating means for altering said magnetic field in response to said fluid temperature, and meter means responsive to said signal for producing a direct density indication.

References Cited in the file of this patent

UNITED STATES PATENTS

| | | |
|---|---|---|
| 2,664,011 | Boonshaft | Dec. 29, 1953 |
| 2,856,240 | Breazeale et al. | Oct. 14, 1958 |
| 2,981,111 | McIlwraith et al. | Apr. 25, 1961 |
| 2,992,561 | Burt | July 18, 1961 |
| 3,040,585 | Chatel et al. | June 26, 1962 |

OTHER REFERENCES

MacInnes et al.: A Magnetic Float Method for Determining the Densities of Solutions. The Review of Scientific Instruments. Volume 22, Number 8, August 1951. (Pages 642–646.)

Hargens: Portable Liquid Density Instruments Employing Transistors. The Review of Scientific Instruments. Volume 28, Number 11, November 1957. (Pages 921–923.)

Lamb et al.: The Densities of Certain Dilute Aqueous Solutions by a New and Precise Method. Journal of the American Chemical Society. Volume 35. (Pages 1666–1693.)